United States Patent [19]

Loose

[11] 3,951,169

[45] Apr. 20, 1976

[54] SANITARY WATER VALVE

[75] Inventor: Bernd Loose, Krove, Mosel, Germany

[73] Assignee: American Standard Inc., New York, N.Y.

[22] Filed: Apr. 19, 1974

[21] Appl. No.: 462,288

[52] U.S. Cl. ........................ 137/625.41; 137/454.2
[51] Int. Cl.² ......................................... F16K 11/06
[58] Field of Search ....... 137/625.4, 625.41, 625.17, 137/454.2, 454.5, 454.6

[56] References Cited
UNITED STATES PATENTS

| | | | |
|---|---|---|---|
| 2,987,070 | 6/1961 | Fraser | 137/454.5 X |
| 3,035,612 | 5/1962 | Lyon | 137/625.4 X |
| 3,433,264 | 3/1969 | Parkison | 137/625.17 |
| 3,667,503 | 6/1972 | Farrell et al. | 137/625.4 |
| 3,831,621 | 8/1974 | Anthony et al. | 137/454.6 X |

Primary Examiner—Henry T. Klinksiek
Attorney, Agent, or Firm—James J. Salerno, Jr.; Robert G. Crooks; Tennes I. Erstad

[57] ABSTRACT

An improved sanitary water faucet having a valve body with control elements formed by two discs wherein the first disc is stationary and has water inlet openings and an outlet opening, connected on one side to the valve manifold. The other side is directed towards the second disc, which is movably arranged on the first disc. The second disc has a surface cavity overlapping the inlet openings, and outlet opening. A noise isolating means preferably consisting of an elastic plate is disposed between the control elements and the valve body. In another embodiment, the isolating means is an elastic valve cartridge disposed in and secured to the valve body and containing the first and second discs. In still a further embodiment, the isolating means is disposed between the discs and the cartridge.

9 Claims, 4 Drawing Figures

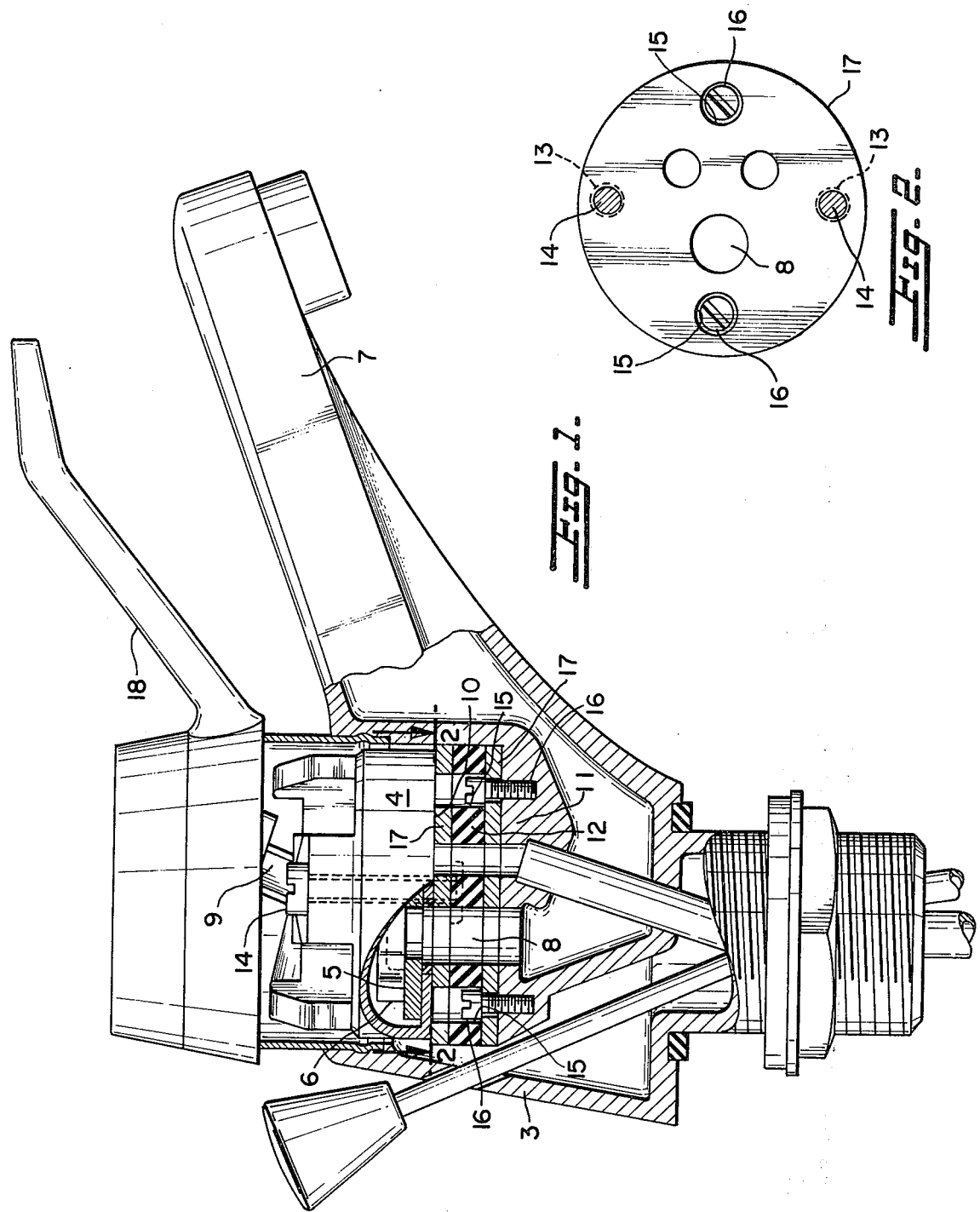

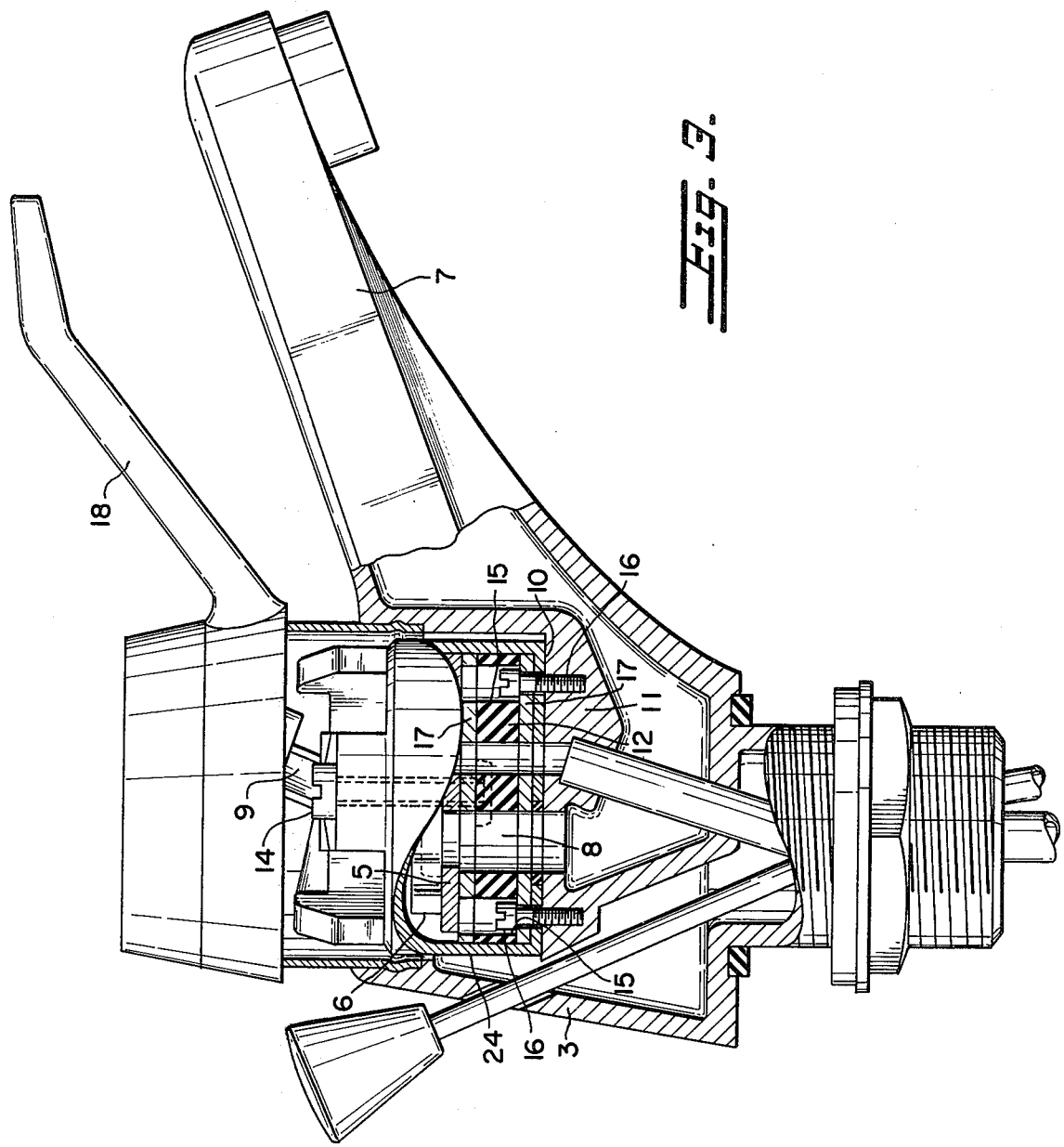

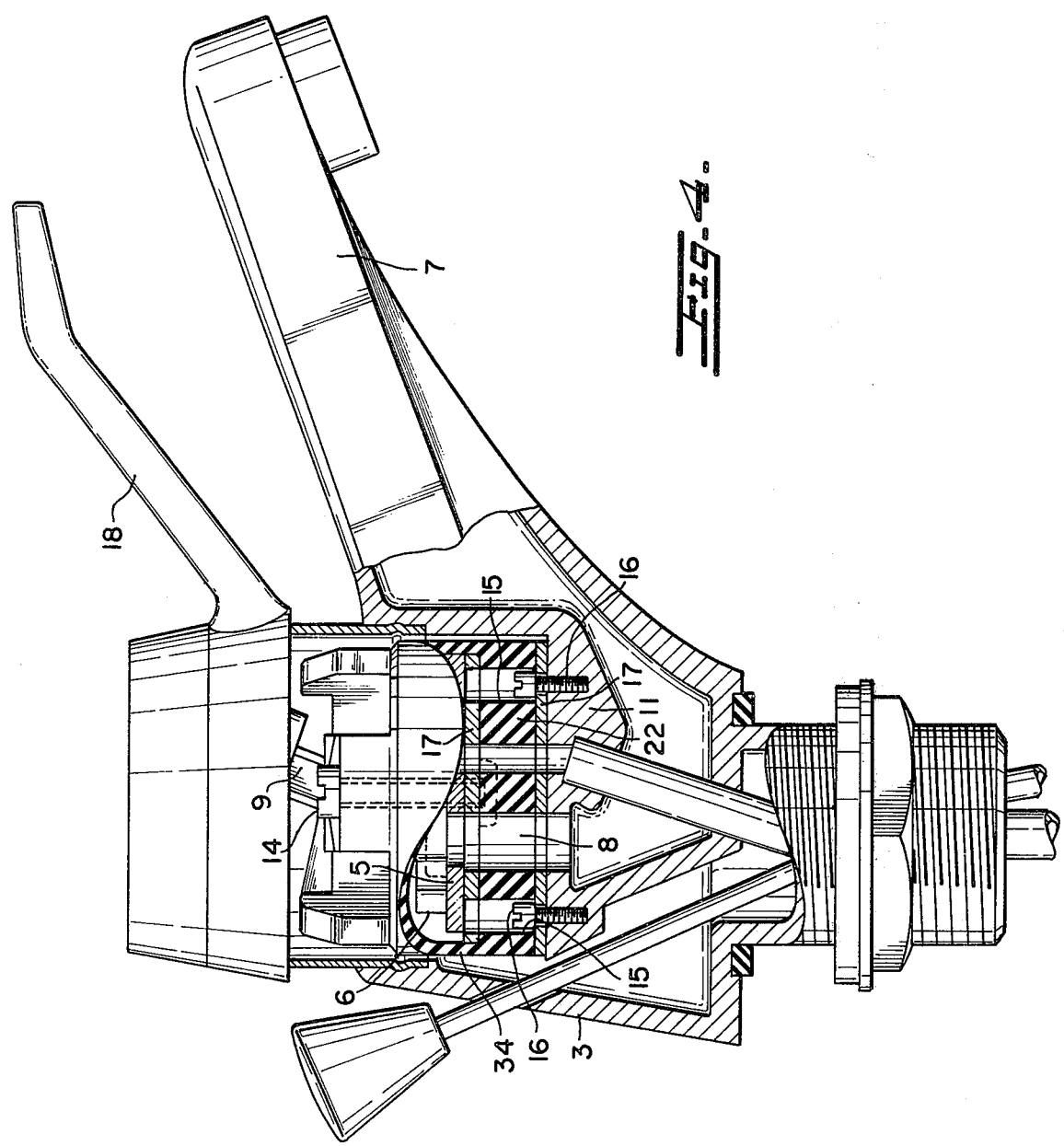

SANITARY WATER VALVE

CROSS REFERENCE TO RELATED INVENTIONS

The mixing faucet and valve in accordance with the present invention represents improvements of the faucet and valve disclosed in U.S. pat. Nos. 3,433,264 and 3,533,436.

BACKGROUND OF THE INVENTION

In recent years, mixing faucets have to a large extent replaced the separate hot and cold water faucets which are used on sinks or lavatories. In mixing faucets, hot and cold water have been mixed to the desired ratio and delivered to the sink lavatory from a single spot at the desired temperature with the desired rate of flow. These faucets are usually provided with a single handle or lever which can be used to control both the desired rate of flow and the desired temperature of the water. In using mixing valves, the control handle is designed so that the fore-and-aft direction controls the rate of flow, and the side-to-side motion of the handle controls the temperature of the water. In traditional types of faucets, the lever is arranged so that a movement to the left causes hot water to flow while a movement to the right causes cold water to flow.

Mixing faucets are generally designed to incorporate a mixing valve which is contained in the form of a cartridge so that it may be removably attached to the manifold of the faucet housing within the decorative structure. Valve cartridges of this type include inlet openings for the entry of hot and cold water from the housing of the faucet, and an outlet opening through which the desired mixture of water may be returned from the valve cartridge to the faucet for discharge through a spout into the sink or lavatory. A stationary valve seat disc has been provided within the cartridge and includes ports corresponding to the openings in the housing. A movable valve plate disc is also provided and arranged for slidable sealing contact with the valve seat disc. The valve plate disc includes either a cavity in its surface adjacent to the valve seat disc, or ports therethrough which can be disposed to cooperate with corresponding ports in the valve seat disc to admit water from the hot and cold water lines for mixing purposes.

The movable valve plate disc is coupled to the control lever of the mixing faucet. The valve seat and plate discs are preferably constructed of a very hard ceramic material such as aluminum oxide, and their mating surfaces are polished extremely smooth and flat. These materials do not deteriorate appreciable with time, and are so hard that very little wear takes place even between their cooperating surfaces.

One of the problems of mixing faucets of this type has been their noisiness of operation due to cavitation occuring within the valve seat and plate discs. In order to reduce the noise problem, the cavity formed within the valve plate disc was provided with a series of ridges or terraces which were designed to break up, divide, and distribute the cavitation bubbles which are formed. However, these design improvements of the prior art managed to only reduce the noise level so that for some areas, it would not be objectionable. However, under certain plumbing codes, the cavitation noise produced within the valve plate disc and transmitted through the valve body and the feed pipes of the faucet was still found to be objectionable. In another embodiment of the prior art, a single layer screen was added across the ridges or terraced cavity of the valve plate disc to further break up the cavitation bubbles, responsible for the noise during the operation of the faucet. However, although the resultant noise was reduced, it was still found to objectionable under certain plumbing code standards.

Accordingly, it is an object of the present invention to provide a mixing faucet which is capable of reducing the noise level below mixing faucets of the prior art during operation.

It is a further object of the present invention to provide a mixing faucet which is capable of quiet operation to meet a larger number of plumbing code standards, and which is simple in design, easy to construct, and reliable in operation.

SUMMARY OF THE INVENTION

Briefly, the objects of the invention are fulfilled by providing a sanitary water faucet having a mixing valve with control elements formed by two ceramic discs, mounted on a noise isolating plate. The first disc is fixed or stationary, and is provided with inlet openings which are connected on one side to the water pipe of the valve manifold, whereas the other side is directed towards the second disc. The second disc is arranged to be movable on the surface of the first disc, and has a surface cavity which can simultaneously overlap the inlet openings, and an outlet opening also formed in the first disc.

In the invention, a noise isolating material is placed between the control elements and the valve body to isolate the body noises. The valve body receives a casing or cartridge for holding the discs. The material for isolating the body noise can either form the casing for the discs, or be arranged between the discs and the casing, or between the valve body and the casing, according to the invention.

Preferably, the material isolating the body noise is formed by an isolating plate disposed between the bottom of the casing and the manifold of the valve.

In another embodiment of the present invention, the isolating plate is equipped with threaded openings for a screw connection with the casing. The isolating plate may also include perforations to countersink screws which are coupled to the bottom of the valve body.

In an embodiment, the isolating plate has disposed on its bottom side and on its upper side, a material of greater hardness such as a metal plate.

Other objects and features of the present invention will become apparent from the following detailed description when taken in connection with the accompanying drawing.

It is to be understood, however, that the drawing is designed for the purpose of illustration only and not as a definition of the limits of the invention to which reference should be made to the appended claims.

BRIEF DESCRIPTION OF THE DRAWING

In the drawing wherein similar reference numerals denote similar elements throughout the several views:

FIG. 1 shows a sanitary water faucet in form of a mixing valve in longitudinal section and including the noise isolating plate disposed between the cartridge and the valve manifold;

FIG. 2 is a top view of the isolating plate of the invention.

FIG. 3 is a cross sectional view of another embodiment of the invention showing the noise isolating plate disposed within the valve cartridge; and FIG. 4 is a cross sectional view of a further embodiment of the invention showing the valve cartridge used as the noise isolating means.

DETAILED DESCRIPTION OF THE INVENTION

In FIGS. 1 and 2, a valve body 3 of the mixing valve receives a casing or cartridge 4 with control elements which are formed by two discs 5 and 6. Disc 5 is tightly secured and has two inlet openings for hot and cold water as well as an outlet opening 8 leading to outlet 7 for the mixed water. Disc 6 is movable on disc 5 so that it can slide or swivel by means of a control lever 18. Disc 6 has a surface cavity for mixing which operates together with the inlet openings and the indicated outlet opening 8 of disc 5.

Between the bottom 10 of casing 4, and the bottom or manifold 11 of valve body 3 is a body noise isolating plate 12 preferably in form of an elastic isolating material such as rubber or plastic as shown in FIGS. 1, 3 and 4. Isolating plate 12 is provided with threaded openings 13 to receive screws 14. In this way, isolating plate 12 is connected to casing 4. To connect isolating plate 12 to bottom of manifold 11 of valve body 3, perforations 15 are formed in isolating plate 12 to receive countersink screws 16 which are fastened to bottom 11 of valve body 3. In order that the screw connection will guarantee an equal power transmission, metal plates 17 are mounted on the upper and lower surfaces of isolating plate 12.

FIG. 3 shows another embodiment of the invention wherein the isolating plate is provided between secured disc 5 and the bottom of cartridge 24. Countersunk screws 16 received in perforations 15 are used to secure both the bottom 10 of cartridge 24 and noise isolating plate 12 to manifold 11. Screws 14 threaded into openings 13 of plate 12 secure stationary disc 5 within cartridge 24 and against the upper surface 17 of isolating plate 12.

In FIG. 4, casing 34 is provided with a noise isolating bottom 22 constructed of an elastic isolating material. Bottom 22 includes perforations 15 so as to receive countersunk screws 16 which secure the cartridge to manifold 11. Screws 14 are threaded into openings 13 in cartridge bottom 22 to secure stationary the disc within the cartridge and against the noise isolating bottom.

In all embodiments, the noise isolating plate or bottom surface serves to cushion discs 5 and 6 during the operation of the valve so that cavitation noise cannot be directly transmitted through the valve body.

While only a few embodiments of the present invention have been shown and described, it will be obvious to those skilled in the art that many changes and modifications may be made thereunto without departing from the spirit and scope of the invention.

What is claimed is:

1. In a sanitary water faucet having a valve body with control elements formed by two discs, the first disc being stationary and having water inlet openings connected on one side to the valve manifold, and on the other side directed towards the second disc which is movably arranged on the first disc, the second disc having a surface cavity overlapping the inlet openings and an outlet opening formed in the first disc, the improvement comprising elastomeric noise isolating plate means disposed between the first disc and the valve body.

2. The sanitary water faucet according to claim 1 wherein the faucet includes a cartridge secured to the valve body for containing the first and second discs and said isolating plate means is disposed between the stationary disc and bottom of the cartridge.

3. The sanitary water faucet according to claim 1 wherein the faucet includes a cartridge for containing the first and second discs and said isolating plate means is disposed between the cartridge and the valve body.

4. The sanitary water faucet according to claim 3 wherein said elastomeric noise isolating plate means comprises an elastic plate.

5. The sanitary water faucet according to claim 3 wherein said elastomeric isolating plate means includes threaded openings for a screw connection with the cartridge, apertures formed in said isolating plate means, and countersunk screws disposed through the apertures for securing said isolating plate means to the valve body.

6. The sanitary water faucet according to claim 1 wherein said elastomeric isolating plate means comprises an elastic plate having a material of greater hardness on its upper and lower surfaces.

7. The sanitary water faucet according to claim 6 wherein said material of greater hardness comprises metal plates.

8. The sanitary water faucet according to claim 1 wherein said elastomeric noise isolating plate means substantially coextends with the stationary disc.

9. The sanitary water faucet according to claim 1, wherein said elastomeric noise isolating plate means comprises an elastic valve cartridge disposed in and secured to the valve body and containing the first and second discs, said plate means, comprising the bottom of said elastic cartridge located between the first disc and valve body.

* * * * *